(12) United States Patent
Hatano et al.

(10) Patent No.: US 8,789,237 B2
(45) Date of Patent: Jul. 29, 2014

(54) AIR-BLOW WORK MACHINE

(75) Inventors: Makoto Hatano, Tokyo (JP); Yusuke Kinoshita, Tokyo (JP)

(73) Assignee: Yamabiko Corporation, Tokyo (JP)

( * ) Notice: Subject to any disclaimer, the term of this patent is extended or adjusted under 35 U.S.C. 154(b) by 348 days.

(21) Appl. No.: 13/278,250

(22) Filed: Oct. 21, 2011

(65) Prior Publication Data

US 2012/0096672 A1    Apr. 26, 2012

(30) Foreign Application Priority Data

Oct. 22, 2010    (JP) .................................. 2010-238014

(51) Int. Cl.
*A47L 5/14* (2006.01)
(52) U.S. Cl.
USPC .............................. 15/405; 15/414
(58) Field of Classification Search
USPC ........ 15/405, 316.1, 317, 318, 330, 345, 404, 15/406, 344, 414, 322, 400, 402, 145, 15/176.1; 138/103, 177
See application file for complete search history.

(56) References Cited

U.S. PATENT DOCUMENTS

| | | | |
|---|---|---|---|
| 4,663,799 A * | 5/1987 | Kiyooka ......................... 15/330 |
| 4,723,893 A * | 2/1988 | Kiyooka et al. ............... 417/234 |
| 4,746,274 A * | 5/1988 | Kiyooka et al. ............... 417/234 |
| 5,821,473 A | 10/1998 | Takahashi |
| 5,841,080 A | 11/1998 | Iida et al. |
| 6,105,206 A | 8/2000 | Tokumaru et al. |
| 6,324,720 B1 | 12/2001 | Beckey et al. |
| 6,826,901 B2 | 12/2004 | Hebert |
| 7,774,896 B2 | 8/2010 | Andresen et al. |
| 8,418,437 B2 * | 4/2013 | Oba et al. ........................ 60/264 |
| 2002/0104186 A1 * | 8/2002 | Miyamoto ...................... 15/414 |
| 2010/0031628 A1 | 2/2010 | Oba et al. |
| 2010/0086412 A1 | 4/2010 | Egawa |
| 2011/0275302 A1 | 11/2011 | Tarada |

FOREIGN PATENT DOCUMENTS

| | | |
|---|---|---|
| JP | 05026762 A | 2/1993 |
| JP | 2001289026 A | 10/2001 |
| JP | 2003108144 A | 4/2003 |
| JP | 2008-255877 | 10/2008 |

* cited by examiner

*Primary Examiner* — Dung Van Nguyen
(74) *Attorney, Agent, or Firm* — Kilyk & Bowersox, P.L.L.C.

(57) ABSTRACT

A blower tube (4) to be connected to a power blower has a tube main body (42) having a distal end portion (42a) diminished in diameter toward its distal end and an attachment (44) to be coupled to the distal end (42a) of the tube main body (42) and including a distal end portion (44a) gradually diminished in diameter toward its distal end. Both these distal end portions (42a, 44a) are each provided three projections at distant position to protrude radially inward toward an axial line of the blower tube (4). The first projections (46) on the tube main body (42) and the second projections (48) on the attachment are positioned offset in phase to align in an alternate order. The blower tube (4) having the projections (46, 48) at the distal end portion can reduce the noise caused by ejection of a high-speed airflow.

13 Claims, 9 Drawing Sheets

AIR-BLOW WORK MACHINE

The present application claims priority from Japanese Patent Application No. 2010-238014, filed Oct. 22, 2010, which is incorporated herein by reference.

FIELD OF THE INVENTION

The present invention relates to a blower tube for use with an air-blow work machine, which can reduce noises of the work machine in operation. The present invention also relates to an air-blow work machine equipped with such a blower tube.

BACKGROUND OF THE INVENTION

As known from Japanese Patent Laid-open Publication JP 2008-255877 (hereafter called Patent Document 1), air-blow work machines are known. Machines of this type are used to blow fallen leaves, rubbishes, waste cans, and so on, to clean the ground. They are generally called power blowers as often called in this application as well. These power blowers have a blower tube, which is typically a plastic mold, coupled to a blower main body. In operation, a high-speed airflow is blown out from the distal end of the blower tube. A user of such a power blower may direct the distal end of the blower tube toward fallen leaves, etc. on the ground to blow and gather them with a high-speed airflow from the blower tube. While the power blower disclosed by the said Publication JP 2008-255877 is a hand-held one, also known are a backpack type power blower whose main body is carried on a user's back in operation (U.S. Pat. No. 7,774,896 hereafter called Patent Document 2) and a stationary power blower whose main body is fixed stationary in operation.

SUMMARY OF THE INVENTION

With the object to reduce noises of the backpack type power blower, Patent Document 2 proposes to interpose a sound-absorbing material between a frame and a drive source mounted on it.

Noises of the power blower include one caused by ejection of the high-speed airflow from the distal end of the blower tube in operation. As this noise is a great nuisance to the ambient, there is a demand for a technology capable of reducing noises at the distal end of the blower tube.

It is therefore an object of the present invention to provide a blower tube for an air-blow work machine, which can reduce noises caused by ejection of a high-speed airflow from the blower tube, and to provide such an air-blow work machine equipped with the blower tube.

A further object of the present invention is to provide a blower tube for an air-blow work machine, which can reduce noises caused by ejection of a high-speed airflow from the blower tube by employing a special design at the distal end portion of the blower tube, and to provide such an air-blow work machine equipped with the blower tube.

A yet further object of the present invention is to provide a blower tube for an air-blow work machine, which can reduce noises caused by ejection of a high-speed airflow from the blower tube by complicating frequency bands of the noises cause by ejection of a high-speed airflow from the blower tube, and to provide such an air-blow work machine equipped with the blower tube.

According to the present invention, there is provided a blower tube to be detachably coupled to an air-blow work machine which includes a blower main body housing an air blasting mechanism driven by a drive source, said blower tube, when coupled to the blower main body, receiving a high-speed airflow generated by the air blasting mechanism and releasing it externally, comprising:

a plurality of projections located at circumferential intervals on a distal end portion of said blower tube to protrude radially inward of said blower tube.

In the present invention, the projections provided at the distal end portion of the blower tube mingle the high-speed airflow to be released from the blower tube. Thereby, the projections can change the frequency bands of noises to more complicated frequency bands and thereby can reduce the noises. The projections are preferably in an odd number. This is based upon a result of an experiment that will be explained later.

The other objects and advantages of the present invention will become apparent from the detailed explanation of preferred embodiments of the invention that will follow.

DETAILED DESCRIPTION OF THE INVENTION

Figure 1:
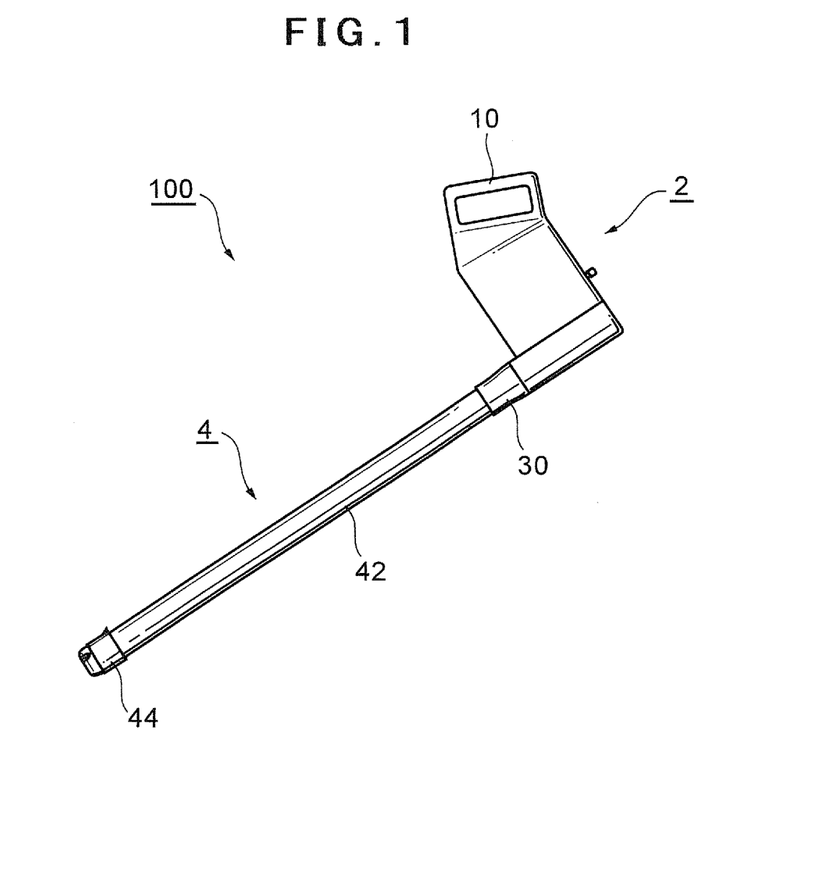
FIG. 1 is a side elevational view of a hand-held power blower, which is an air-blow work machine taken as an embodiment of the present invention.
Figure 2:
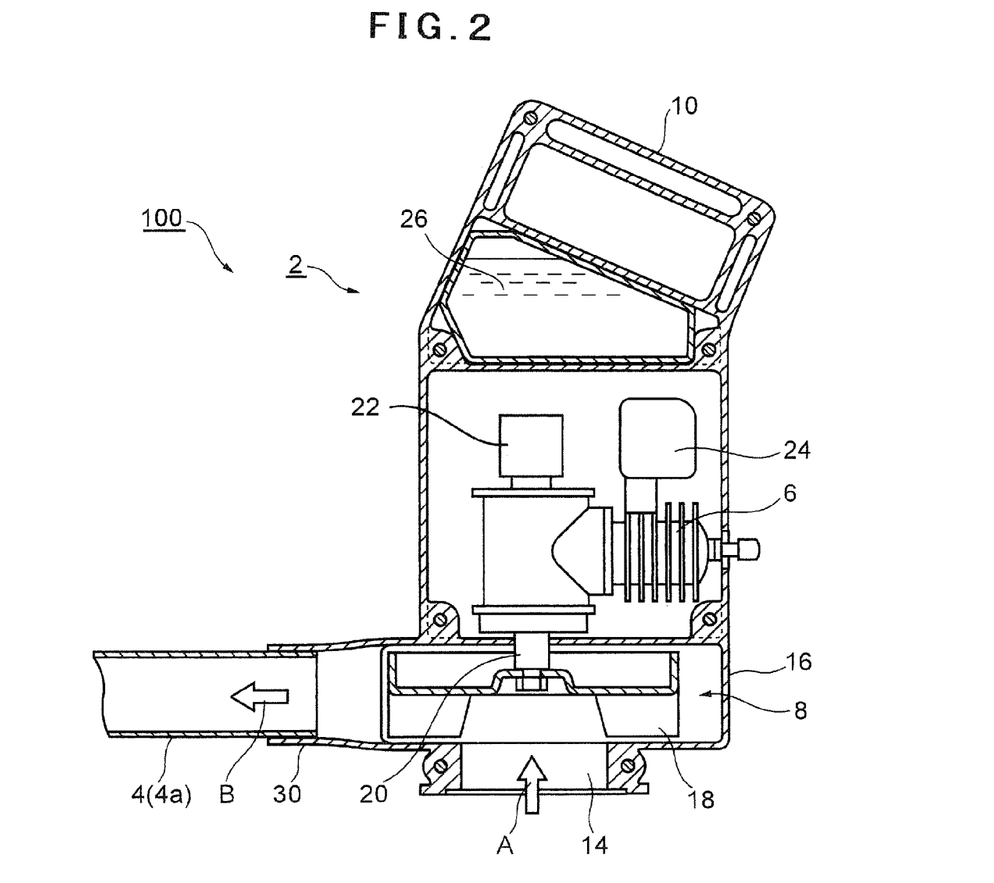
FIG. 2 is a cross-sectional view of a blower main body of the power blower of FIG. 1

A preferred embodiment of the present invention is explained below with reference to the accompanying drawings. FIGS. 1 and 2 show a hand-held power blower taken as an embodiment of the air-blow work machine according to the present invention. FIG. 1 is a side elevational view of the hand-held power blower, and FIG. 2 is the cross-sectional view of a blower main body of the power blower.

With reference to FIG. 1 and FIG. 2, the hand-held power blower 100 comprises a blower main body 2 and a blower tube 4 detachably coupled to the blower main body 2. The blower main body 2 houses a compact-sized internal combustion engine as a drive source (FIG. 2). The internal combustion engine 6 used in this embodiment is an air-cooled two-stroke single-cylinder internal combustion engine, but a four-stroke engine is usable instead. The blower main body 2 has a centrifugal air-blasting mechanism driven by the internal combustion engine 6. A high-speed airflow B (FIG. 2) generated by the centrifugal air-blasting mechanism 8 is supplied to the blower tube 4 and released outside from the distal end of the blower tube 4.

Gripping a handle 10 on a top of the blower main body 2 by one hand, a user can operate a throttle trigger (not shown) with a finger to control the output of the internal combustion engine 6. In other words, the user can control the volume and flow rate of the high-speed airflow discharged from the blower tube 4 by manipulating the throttle trigger with his/her finger.

The centrifugal air-blasting mechanism 8 includes a fan case 16 having an air inlet 14 for the blower and a centrifugal fan 18 contained in the fan case 18. The centrifugal fan 18 is connected to one end of the output shaft 20 of the internal combustion engine 6. By manipulating a recoil starter 22, the user can activate the internal combustion engine 6. In FIG. 2, reference numeral 24 denotes a muffler and reference numeral 26 designates a fuel tank.

Once the internal combustion engine 6 is started up, the centrifugal fan 18 is driven. Under high-speed rotation of the centrifugal fan 18, external air A taken through the blower-use air inlet 14 is discharged from an air-blast port 30. The high-speed airflow B supplied to the air-blast port 30 is discharged externally through the blower tube 4.

Figure 3:
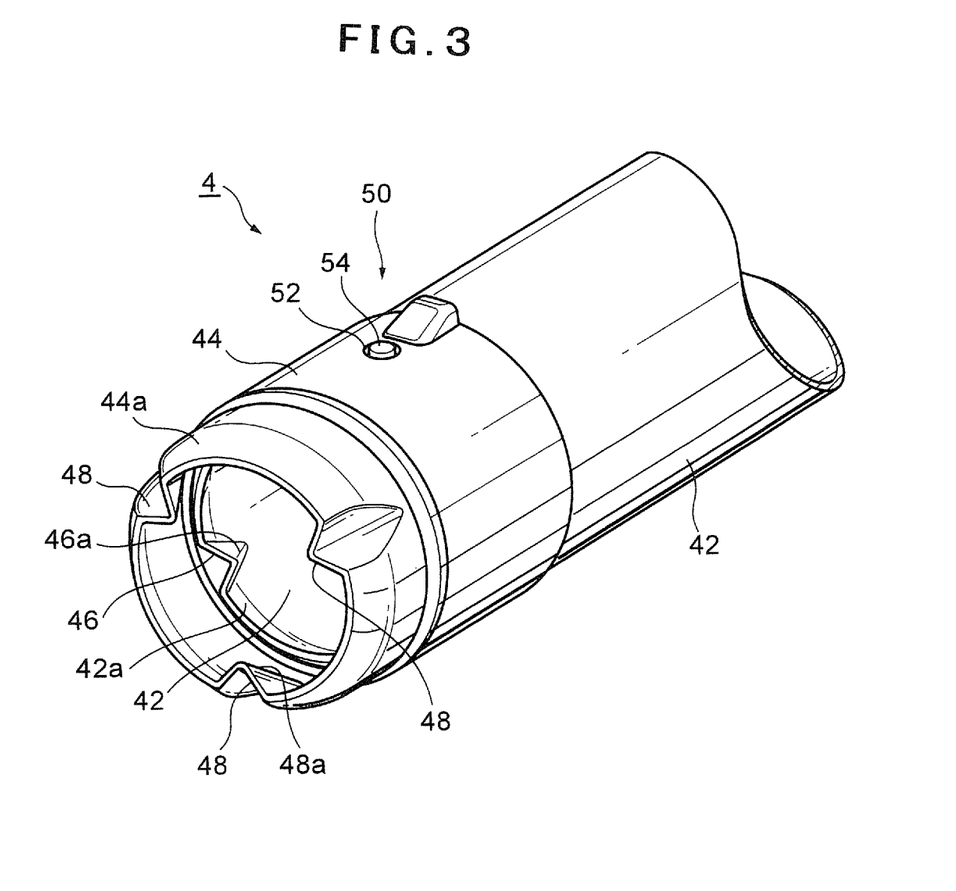
FIG. 3 is an enlarged perspective view of the distal end portion of the blower tube according to the embodiment.

With reference to FIGS. 1 and 3, the blower tube 4 is composed of a tube main body 42 detachably coupled to the blower main body 2 and an attachment 44 detachably attached to the distal end portion of the tube main body 42. Both the tube main body 42 and the attachment 44 are plastic resin molds.

Figure 5:
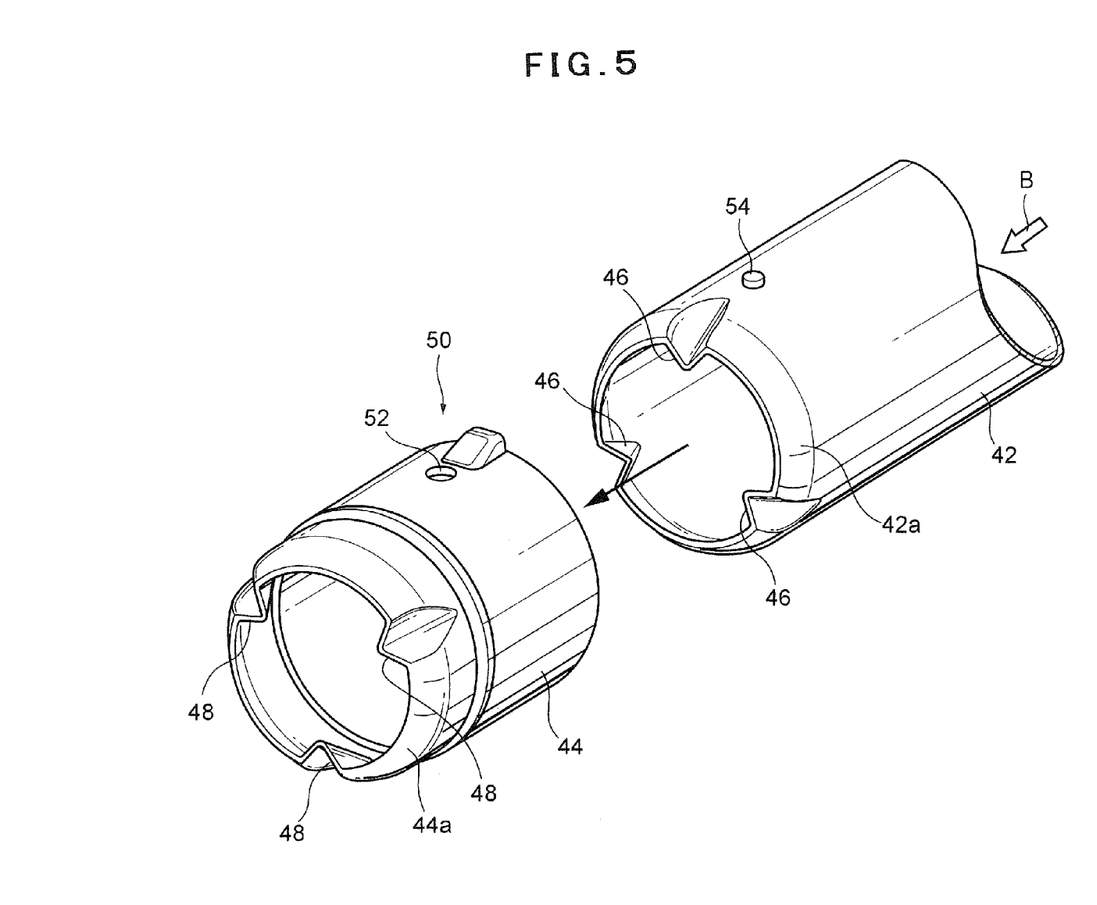
FIG. 5 is an exploded, perspective view of the distal end of the blower tube shown in FIG. 3.
Figure 6:
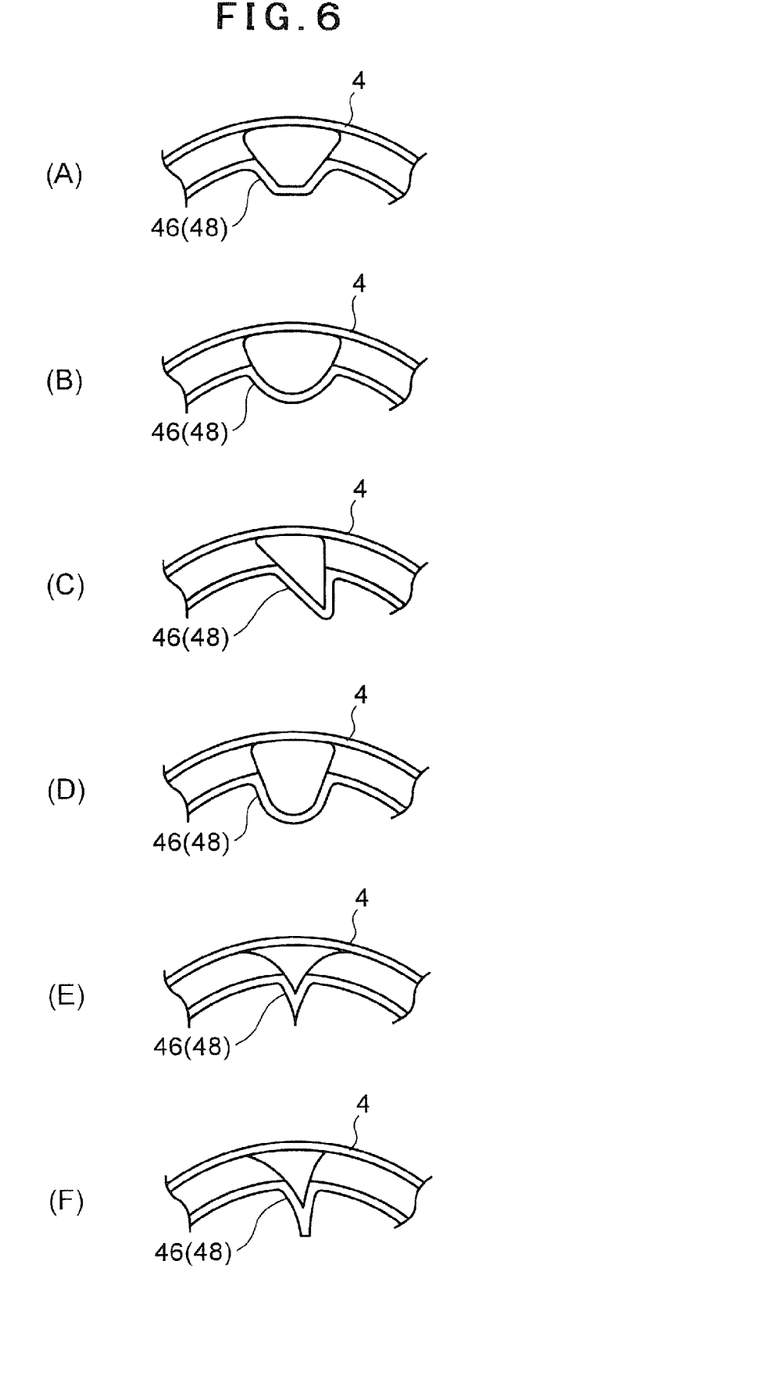
FIGS. 6A through 6F are views of a variety of front view configurations of projections provided at the distal end portion of the blower tube.

The tube main body 42 has an elongated cylindrical form extending straight and having a circular cross-section. The distal end portion 42a of the tube main body 42 gradually diminishes in diameter toward its distal end, i.e. the front end (FIG. 5). On the other hand, the attachment 44 has a cylindrical form having a circular cross section with a diameter approximate to the diameter of the outer circumferential diameter of the tube main body 42.

Although optional, the distal end of the blower tube 4 in this embodiment has the first forward-tapered portion defined by the distal end portion 44a of the attachment 44 and the second portion that is preferably tapered toward its distal (front) edge and slightly apart in the upstream side from the distal end portion 44a of the attachment 44 in the axial direction of the blower tube 4. In a modified example, the distal end portion 42a of the tube main body 42 may be non-tapered toward the front edge and equal in inner diameter throughout its entire length up to its front (distal) edge. Also the attachment 44 may not have the forward-tapered shape at its distal end portion 44a and may be equal in inner diameter throughout the entire length of the front (distal) end portion up to its front edge.

Figure 4:
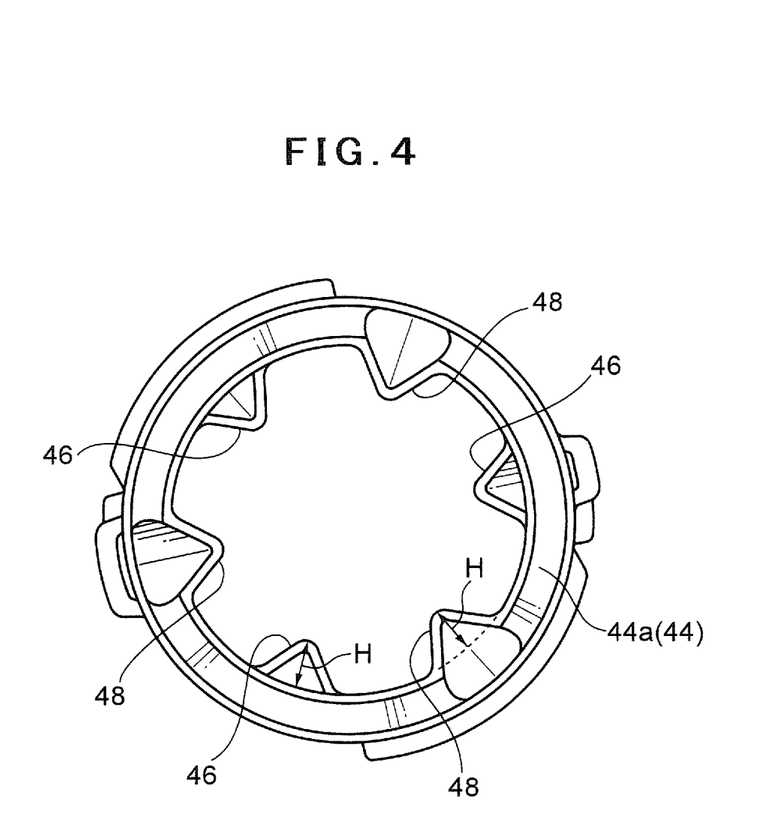
FIG. 4 is a front elevational view of the blower tube shown in FIG. 3.

With reference to FIG. 3 through FIG. 6F, the front end portion 42a of the tube body 42 having the forward-tapered configuration and the front end portion 44a of the attachment 44 having the forward-tapered configuration have projections at three positions to protrude radially inward toward the axial line of the blower tube 4. The three projections of the front end portion 42 of the tube main body 42 are referred to as first projections 46 and those of the attachment 44 are referred to as second projections 48. Each of the first and second projections preferably has the form of an isosceles triangle in its front plane. The three first projections 46 of the tube main body 42 are located at equal intervals in the circumferential direction, namely, at intervals of 120 degrees (FIGS. 4 and 5). Also the three second projections 48 of the attachment 44 are located at equal intervals in the circumferential direction, namely, at intervals of 120 degrees (FIGS. 4 and 5).

FIG. 6A through 6F illustrate a variety of front-view configurations for the first and second projections 46 (48). The first and second projections 46 (48) may be trapezoidal in their front view as shown in FIG. 6A or dome-shaped as shown in FIG. 6B. Alternatively, the first and second projections 46 (48) may have the form of a scalene triangle in which two sides other than the base are not equal in their front view as shown in FIG. 6C, or may define an arch at its top as shown in FIG. 6D. Further, two sides of each projection 46 (48) defining the vertex may be arcuate as shown in FIG. 6E. While the two sides of the projection 46 (48) shown in FIG. 6E are arcuate inward, they may be arcuate to bulge outwardly. As a modification of the configuration of FIG. 6F, the convex need not be a point and may define a plane either flat or curved in the front view of the blower tube 4 as shown in FIG. 6F.

Referring back to FIG. 3 through FIG. 6F, each of the first and second projections 46, 48 having the front-view shape of an isosceles triangle is in form of a notch that is an inward indent in the wall of the tube main body 42 or the attachment 44 toward the axial line of the tube main body 42 or the attachment 44. However, it is sufficient for each projection 46 (48) to protrude in a generally triangular shape into the circular cross-sectional inner passage of the tube main body 42 or the attachment 44 toward the axial line of the inner passage. Therefore, the first and second projections 46 may be solid instead of being hollow. This is applicable to the variety of their shapes shown in FIGS. 6A through 6F as well.

The first and second projections 46 (48) may be used typically in combination of the isosceles front-view configurations as shown in FIGS. 3 to 5. Otherwise, any combinations with any desired one from the configurations shown in FIGS. 6A through 6F may be employed as well.

Each of the first and second projections 46, 48 in form of the isosceles triangle in its front view has a three-dimensional configuration with a ridge line 46a (48a) extending in parallel to the axial line of the airflow passage in the blower tube 4 (FIG. 4) and gradually decreasing in height H (FIG. 4) in the upstream direction of the airflow in the blower tube 4. The first projections 46 and the second projections 48 may be equal to or different from one another other in height H.

The first and second projections 46 and 48 in the triangular configuration in their frontal view are integrally molded with the tube main body 42 and the attachment 44 respectively. However, the first and/or second projections 46 (48) may be prepared as separate elements to be bonded to the inner circumferential wall of the forward-tapered portions 42a (44a) of the tube main body 42 (attachment 44). This is applicable to the variety of configurations of the projections 46 (48) shown in FIGS. 6A through 6F as well.

Alternatively, the blower tube 4 may be made in form of a unitary element having both the forward-tapered portions 42a, 44a by incorporating both the tube main body 42 and the attachment 44 in a unitary mold. In this case, the blower tube 4 may include both the three first projections 46 at the forward-tapered portion 42a and the three projections 48 of the forward-tapered portion 44a as its integral parts. Otherwise, it is also possible to prepare the attachment 44 as a separate member to be coupled or bonded to the tube main body 42.

Still referring to FIG. 4, the three first projections 46 on the tube body 42 and the three second projections 48 on the attachment 44 are preferably positioned in different phases such that they appear in an alternate order when viewed from the front face of the blower tube 4. More specifically, the second projections 48 of the attachment 44 are preferably off the phase of the first projections 46 by 60 degrees equally. To ensure this off-phase positioning of the first and second projections 46, 48, a lock mechanism 50 for positional fixture of the attachment 44 relative to the tube main body 42 includes a positioning mechanism comprising one or more depressions 52 and complementary protuberances 54 that can get in engagement with the depressions 52 at a proper relative position in their circumferential direction.

Figure 7:
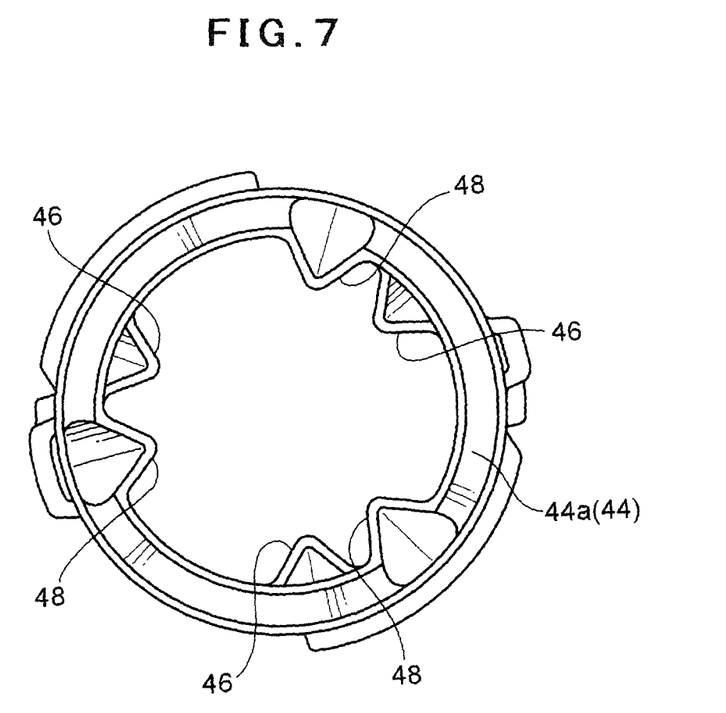
FIG. 7 is a front elevational view corresponding to FIG. 4 for illustrating an arrangement in which the projections provided in two steps at the distal end portion of the blower tube are unequally spaced in the front elevational view.

Instead of being positioned at equal intervals, the first and second projections 46 and 48 may be positioned in the same phase to overlap one another. When they are set not to overlap as explained above, distances between the projections need not be equal 60 degrees (FIG. 7).

Figure 8:
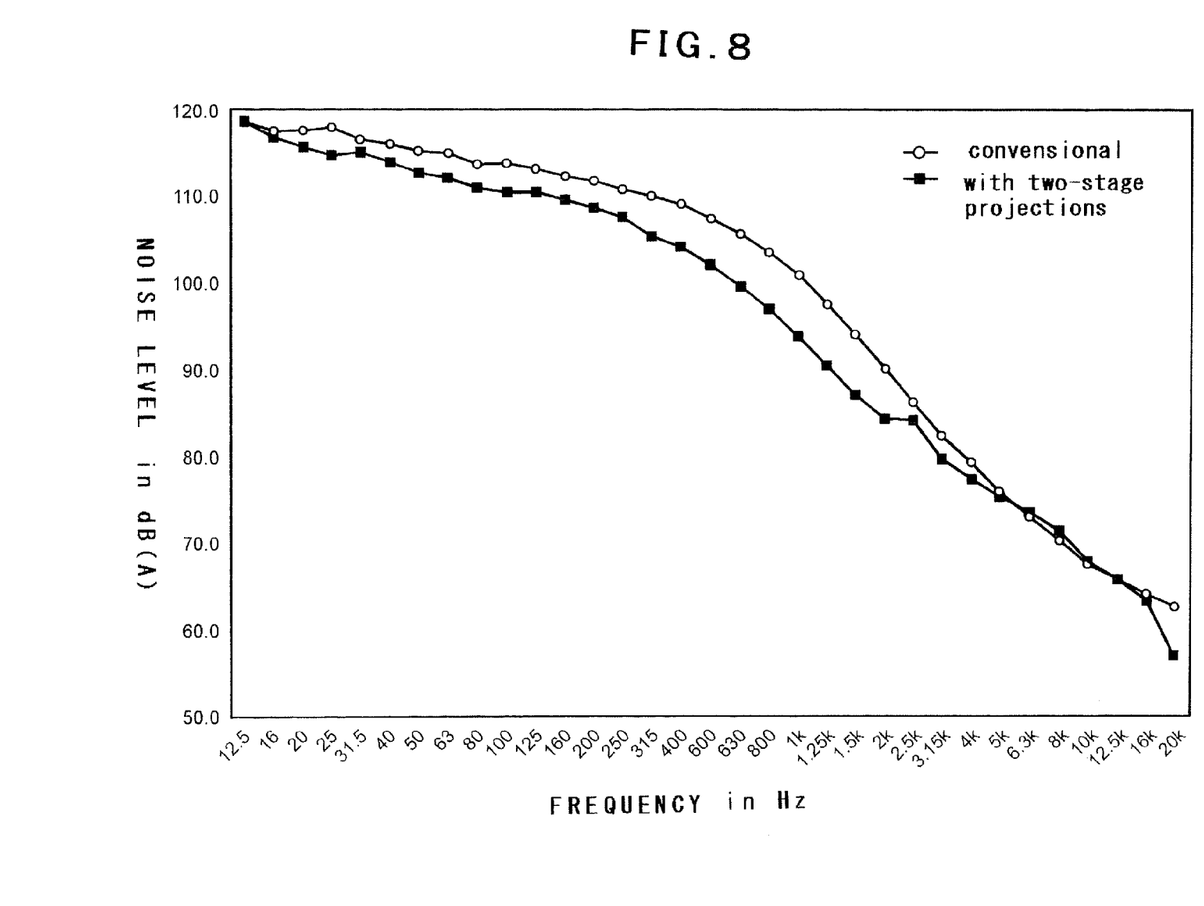
FIG. 8 is a diagram showing a result of measurement of noise reduction effects with the use of the blower tube shown in FIGS. 3 to 6F.

An experiment was carried out to evaluate the noised reduction effects with the embodiment shown in FIGS. 1 through 5, and a result shown in FIG. 8 was obtained. FIG. 8 demonstrates that there was a noise reduction effect in the audible frequency band. In FIG. 8, noise levels are shown in dB(A) that is an A-weighted dB value, white plots show values measured with conventional or existing blower tubes, and black plots show values measured with blower tubes having two sets of projections (46, 48) in two stages.

To know noise reduction effects with the embodiment shown in FIGS. 1 through 5 under various conditions and arrangements of the projections 46 (48) at the distal end portion of the blower tube 4, noises caused by ejection of high-speed airflows from the blower tube 4 were measured through a microphone set a position distant from the blower tube 4 by three meters (3 m).

First Experiment

Difference in Number of the Projections

Only with blower tubes 4 with their attachments being removed, which were different in number of the first projections 46 on their tube main bodies 42, each said projection 46 being in form of an isosceles triangle in its front view, experiments were conducted. Diameter of the blower tubes 4 were 72 mm. As a comparative criterion, an existing blower tube (having a forward-tapered distal end portion) without projections 46 was used. Regarding the tube main body 42, the samples had forward-tapered portions at the distal end portions 42a, and the first projections 46 (each in form of an isosceles triangle in its front view) were formed at the forward-tapered portions.

TABLE 1

| Types of blower tube | CFM | MPH | Change of noise level (dB) |
| --- | --- | --- | --- |
| Comparative blower tube | 708 | 187 | — |
| Sample with three first projections | 660 | 191 | −1.8 |
| Sample with four first projections | 645 | 191 | 0.1 |
| Sample with five first projections | 631 | 191 | −0.9 |
| Sample with six first projections | — | — | 0.4 |

In TABLE 1 above, CFM is an abbreviation of "cubic feet per minute" that herein pertains to the volume of airstream (volume of airflow) discharged from the distal end of each blower tube 4 per minute. MPH is an abbreviation of "miles per hour" that herein pertains to the velocity of the airstream (flow rate of air) discharged from the distal end of the blower tube 4. Changes in noise level were calculated based on the noise level of the existing blower tube.

Still referring to TABLE, the samples with odd number of projections 46, namely, the sample with three projections 46 and the sample with five projections 46 exhibited certain effects of noise reduction. In contrast, samples with even numbers of projections 46, namely, the sample with four projections 46 and the sample with six projections 46 exhibited high noise levels. However, since noise levels are affected by the inner diameter of the blower tube 4, volume and flow rate of the airstream from the blower tube 4, certain effects of noise reduction may be obtained even when with an even number of projections 46.

Second Experiment

Difference in Height of the Projections

With regard to the specific numerical value of height H for the first projections 46 of the tube main body 42, the optimal level is considered to vary mainly with the volume and velocity of the high-speed airflow discharged from the blower tube 4. Taking it into consideration in the second experiment, first made was a reference sample in which the projections 46 have a height H provisionally considered optimum while fixing the number of projections 46 to three. Next made was a tube main body 42 with the equal number (three) of projections 46 having a height H lower than that of the reference sample and a tube main body 42 with the equal number (three) of projections 46 having a height H higher than that of the reference sample. With these samples, changes in noise level were measured. The projections 46 of the blower tubes 4 used in the second experiment were in form of an isosceles triangle in their front view like in the first experiment.

TABLE 2

| Types of blower tube | CFM | MPH | Change of noise level (dB) |
| --- | --- | --- | --- |
| Existing blower tube | 708 | 187 | — |
| Sample with projections of height H | 660 | 191 | −1.8 |
| Sample with lower projections | 694 | 188 | −0.4 |
| Sample with higher projections | 637 | 193 | −1.1 |

The result of the second experiment teaches that there is an optimum value of height H of the projections 46. Therefore, it is recommended to experimentally determine an optimum value of height H of the projections 46, based on the capacity of the power blower 100 to be produced.

Third Experiment

Difference in Number of Stages of Projections

In the embodiment mentioned above, when the three second projections 48 aligned at equal intervals in the circumferential direction of the attachment 44 are called as "projections in the first stage" whereas the three first projections 46 aligned at equal intervals in the circumferential direction of the tube main body 42 are called as "projections in the second stage", TABLE 3 shows a result of measurement of changes in noise level by changing the number of stages of the projections 46 and 48. Additionally, a sample blower tube 4 with three more projections in a third stage was prepared for the third experiment.

Let it be noted the blower tubes 4 used in the third experiment included tube main bodies 42 each having a forward-tapered end portions and that the attachments 44 used were also tapered toward their front (distal) ends.

TABLE 3

| Types of blower tube | CFM | MPH | Amount of change, noise level (dB) |
|---|---|---|---|
| With projections in one stage | 660 | 191 | −1.8 |
| With projections in two stages | 654 | 193 | −4.4 |
| With projections in three stages | 625 | 185 | −3.2 |

TABLE 3 above teaches that the blower tube 4 exhibits a certain effect of noise reduction even with the projections in only one stage but it exhibits highest effects when having the sets of projections 46, 48 in two different stages spaced apart from each other in the flow direction of the high-speed airflow in the blower tube 4. The blower tube 4 having three sets of projections in three different stages also exhibits a higher effect of noise reduction than the blower tube 4 having only one set of projections in one stage. In the blower tubes used in the experiment, all projections were in form of an isosceles triangle in their front view.

Fourth Experiment

Difference in Height of Projections 46, 48

The fourth experiment was carried out to confirm any difference in effect of noise reduction by changes in height H1 of the first projections 46 and height H2 of the second projections 48.

For comparison purposes, a sample with three projections 48 of a standard height in the first stage and three projections 46 of a standard height in the second stage was prepared. Further, samples with various combinations of projections of the standard heights, higher projections and lower projections were prepared. With these samples, effects of noise reduction were evaluated.

Also in the fourth experiment, like in the third experiment, forward-tapered tubes were used as the tube main bodies 42, and tubes with forward-tapered portions 44a were used as the attachments 44. All the projections used were in form an isosceles triangle in their front view.

TABLE 4

| Types of blower tube | Changes in noise level |
|---|---|
| First stage projections (standard) + Second stage projections (standard) | — |
| First stage projections (standard) + Second stage projections (lower) | 0.7 |
| First stage projections (standard) + Second stage projections (higher) | 0.5 |
| First stage projections (lower) + Second stage projections (standard) | 2.2 |
| First stage projections (lower) + Second stage projections (lower) | 1.8 |
| First stage projections (lower) + Second stage projections (higher) | 1.7 |
| First stage projections (higher) + Second stage projections (standard) | 0.6 |
| First stage projections (higher) + Second stage projections (lower) | 0.9 |
| First stage projections (higher) + Second stage projections (higher) | 0.2 |

TABLE 4 above teaches that common heights H for both the first and second projections 46 and 48 produce good effects and that the use of different heights between the first projections 46 and the second projections 48 is not effective so much in regard to noise reduction.

Fifth Experiment

Difference in Diameter of Blower Tubes

To evaluate changes in noise level with difference in diameter of the blower tubes 4, first prepared were three sample blower tubes 4 according to the above-explained embodiment, which were different in diameter and in which both the tube main body 42 and the attachment 44 had forward-tapered configurations with three projections 46 (48) in form of an isosceles triangle in their front view, respectively. More specifically, a blower tube 4 having the diameter of 72 mm was prepared as a reference, and two other blower tubes 4 having the diameters of 65 mm and 63 mm, respectively, were prepared. With these sample blower tubes 4, changes in noise level were evaluated by the fifth experiment.

TABLE 5

| Types of blower tube | CFM | MPH | Amount of change, noise level (dB) |
|---|---|---|---|
| Diameter: 72 mm | 609 | 175 | — |
| Diameter: 65 mm | 572 | 189 | −0.1 |
| Diameter: 63 mm | 550 | 191 | −0.2 |

The result of the experiment shown in TABLE 5 shows that changing the diameter of the blower tube 4 does not produce a prominent contribution to noise reduction.

As such, the results obtained by the series of experiments explained above shows that the power blower 100 exhibits a good effect of noise reduction when it has at least two stages of projections 46 (48) at the distal (front) end portion of the blower tube 4 and when the projections 46 (48) in each stage are in an odd number.

Thus, it is possible to make a deduction as follows. The projections 46 (48) provided at distal end portions of the blower tube 4 interfere a high-speed airflow discharged in a spirally whirling fashion from the distal (front) end of the blower tube 4 and flowing through the blower tube 4. A radially outer portion of the high-speed airflow in the blower tube 4 flows spirally and hits the projections 46 (48). The radially outer portion of the high-speed airflow thereby changes its direction to an axial direction, and this may results in changing the frequency bands of the noises to more complicated frequency bands and thereby contributes to reduction of the noise level.

Figure 9:
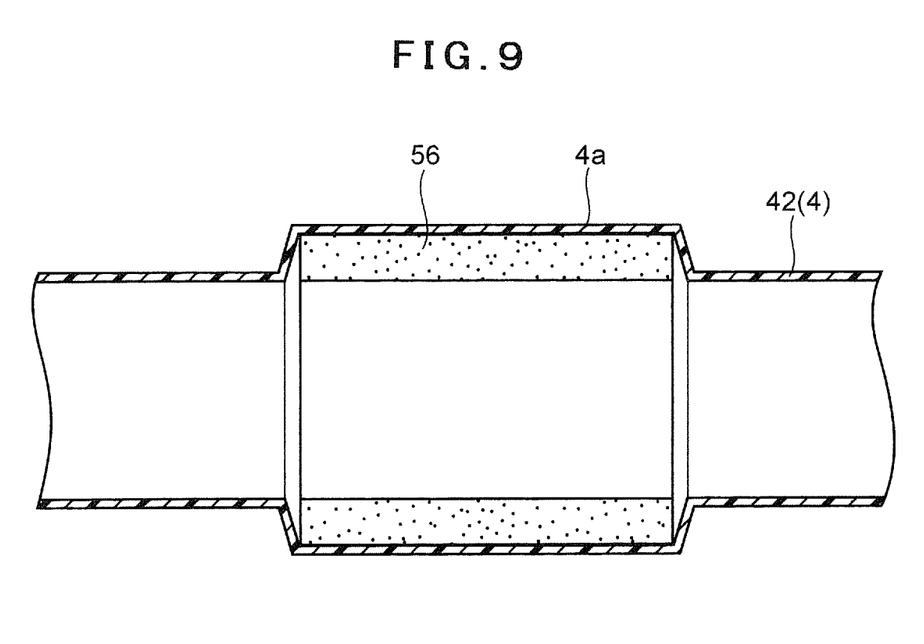
FIG. 9 is a diagram illustrating an embodiment providing an enlarged chamber in a mid portion of the blower tube and a sound absorber provided in the enlarged chamber.

For more complication of the frequency bands of the noises, it is effective to provide an enlarged chamber 4a that is a radially enlarged middle part of the blower tube 4. It is more effective to provide a sound absorber 56 preferably of a cylindrical form in the enlarged chamber 4a. In order to make more complicated the frequency bands of the noise. A typical sound absorber is made of porous, flexible, synthetic sponge that may be urethane foam.

With regard to the configuration of the distal end portion 44a of the blower tube 4, an equivalent effect of noise reduction can be obtained regardless either in the case that the distal end portion 44a (42a) is tapered to gradually diminish its diameter toward its front edge or in the case that the distal end portion 44a (42a) is uniform in diameter from its upstream end to the downstream end with respect to the airflow direction in the blower tube 4. It is also noted that tapering the distal end portion 44a to diminish its diameter toward its distal end contributes to changing the direction of the radially outer portion of the high-speed airflow discharged from the blower tube 4 to an axial direction and thereby enhances straightforwardness of the high-speed airflow discharged from the blower tube 4. With this feature, workability of the power blower 100 can be enhanced as well. Also when the power blower is provided with at least one stage of projections 48 (46), the outer diameter portion of the high-speed airflow flowing out of the blower tube 4 is changed in direction to a flow in parallel to the axial line, and the straightforwardness of the high-speed airflow from the blower tube 4 is enhanced.

The present invention is applicable to portable air-blow work machines, backpack type ones and stationary one. The invention is applicable not only to air-blow work machines equipped with internal combustion engines as their drive sources but also to such work machines using motors as their drive sources.

What is claimed is:

1. A blower tube to be detachably coupled to an air-blow work machine which includes a blower main body housing an air blasting mechanism driven by a drive source, said blower tube, when coupled to the blower main body, receiving a high-speed airflow generated by the air blasting mechanism and releasing it externally, comprising:
   a plurality of projections positioned at circumferential intervals on a distal end portion of said blower tube to protrude radially inward of said blower tube,
   wherein said projections include at least two sets of projections in which one set of projections are in a first stage located at a distal end portion of said blower tube and another set of projections are in a second stage distant from the first stage in the upstream direction with respect to the direction of the high-speed airflow in the blower tube.

2. The blower tube according to claim 1, wherein the set of projections in the first stage and the set of projections in the second stage are equal in number of the projections.

3. The blower tube according to claim 2, wherein the number of projections contained in said set of projections in each of the first stage and the second stage is an odd number.

4. The blower tube according to claim 3, wherein the projections in the first stage and the projections in the second stage are positioned offset in phase such that the projections in the first stage appear alternately with the projections in the second stage when viewed in a front elevational view.

5. The blower tube according to claim 4, wherein the projections in the first stage and the projections in the second stage are positioned offset in phase such that all these projections appear at equal intervals.

6. The blower tube according to claim 5, wherein said blower tube has an enlarged chamber made by enlarging the diameter of a middle portion of the blower tube.

7. The blower tube according to claim 6, further comprising a sound absorber provided in said enlarged chamber.

8. The blower tube according to claim 2, wherein the projections in the first stage and the projections in the second stage are positioned offset in phase such that the projections in the first stage appear alternately with the projections in the second stage when viewed in a front elevational view.

9. The blower tube according to claim 8, wherein the projections in the first stage and the projections in the second stage are positioned offset in phase such that all these projections appear at equal intervals.

10. An air-blow machine, comprising:
    a blower main body;
    an air blasting mechanism housed in said blower main body to generate a high-speed airflow;
    a drive source for driving said air blasting mechanism; and
    a blower tube detachably coupled to said blower main body to receive said high-speed airflow generated by said air blasting mechanism and releasing the high-speed airflow externally,
    wherein said blower tube has a plurality of projections positioned at circumferential intervals on a distal end portion of said blower tube to protrude radially inward of said blower tube, and said plurality of projections of said blower tube includes a set of projections in a first stage and a set of projections in a second stage distant from said first stage in the upstream direction with respect to the direction of the high-speed airflow in the blower tube, said set of projections in the first stage and said set of projections in the second stage being equal in number of the projections.

11. The air-blow machine according to claim 10, wherein the number of projections contained in said of projections in each of the first stage and the second stage is an odd number.

12. The air-blow machine according to claim 11, wherein the projections in the first stage and the projections in the second stage are positioned offset in phase such that the projections in the first stage appear alternately with the projections in the second stage when viewed in a front elevational view of the blower tube.

13. The air-blow machine according to claim 12, wherein the projections in the first stage and the projections in the second stage are positioned offset in phase such that all these projections appear at equal intervals when viewed in a front view of the blower tube.

* * * * *